United States Patent Office 2,909,544
Patented Oct. 20, 1959

2,909,544

ORGANIC PHOSPHORUS COMPLEX

Gail H. Birum, Dayton, Ohio, assignor to Monsanto Chemical Company, St. Louis, Mo., a corporation of Delaware No Drawing. Application February 25, 1954
Serial No. 412,621

12 Claims. (Cl. 260—438)

This invention relates to complexes formed from organic compounds of trivalent phosphorus and more particularly provides certain new complexes of such phosphorus compounds and cuprous cyanide, methods of producing the same, and insecticidal compositions comprising said complexes.

According to the invention there are provided compounds having the formula

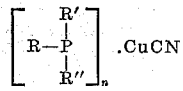

in which R, R' and R" are selected from the class consisting of alkyl and alkoxy radicals of from 1 to 8 carbon atoms and aryl, aryloxy, alkaryl, alkaryloxy, aralkyl and aralkoxy radicals of from 6 to 8 carbon atoms and $n$ is an integer of 1 to 2. This general formula includes complexes of cuprous cyanide and the trialkyl, triaryl, trialkaryl or triaralkyl phosphines such as trimethyl, tri-n-propyl, triamyl, tris(2-ethylhexyl), tri-n-octyl, triphenyl, trinaphthyl, tris(2-ethylphenyl), tribenzyl or phenyl diethyl or butyl hexyl propyl phosphine; the complexes of cuprous cyanide and alkyl, aryl, alkaryl or aralkyl phosphonites such as diethyl ethanephosphonite, dibenzyl toluenephosphonite, dicresyl n-octanephosphonite, di-n-butyl benzenephosphonite, or dimethyl phenylmethanephosphonite; and the complexes of cuprous cyanide and trialkyl, triaryl, trialkaryl, triaralkyl, dialkyl aryl or alkyl diaryl phosphites such as trimethyl, triethyl, triisopropyl, tri-n-propyl, tri-tert-butyl, triphenyl, tri-n-hexyl, tricresyl, tris(2-ethylhexyl), tri-β-naphthyl, amyl diethyl, butyl diphenyl, ethyl methyl phenyl, tribenzyl, benzyl dicresyl or dibenzyl propyl phosphite.

As shown in the above general formula, one or two moles of the trivalent phosphorus compound are combined with one mole of the cuprous cyanide. Generally, the use of at least 2 moles of the phosphite, phosphonite or phosphine compound with one mole of the cuprous cyanide results in production of the higher ratio complexes, i.e., compounds in which 2 moles of the phosphorus compound are combined with one mole of the cyanide. The use of 1:1 ratios of the phosphorus and cyanide compounds is conducive to the formation of the 1:1 complexes; however, depending upon the reaction conditions employed, mixtures of the 1:1 and the 2:1 phosphorus compound-cuprous cyanide complexes may be obtained irrespective of the initial reactant proportions.

Reaction of the trivalent phosphorus compound with the cuprous cyanide occurs very readily, with evolution of heat. While in some instances an inert diluent or reaction medium is advantageously used to mitigate reaction heat and to effect smoother reaction, when the phosphorus compound is a liquid and when the desired product is the 2:1 complex, an excess of the phosphorus compound may be used to serve as diluent. Inert reaction media which may be employed are, for example, ether, dioxane, aliphatic or aromatic hydrocarbons such as hexane, kerosene or benzene, etc. As the carbon content of the alkyl or alkoxy substituents of the trivalent phosphorus compound increases, the reactivity of the same in complex formation may decrease; hence, with some of the trivalent phosphorus compounds it may be beneficial to employ external heat in order to complete the reaction.

The present complexes are stable compounds which range from viscous liquids to crystalline solids. They are soluble in the common organic solvents, e.g., hexane, acetone, ether, etc. While they may be advantageously employed for a variety of commercial and industrial purposes, they are most useful as agricultural insecticides in that they are extremely efficient in destroying plant insects without injury to the plant hosts. The present complexes may be applied to plants as dusts or sprays. They may be admixed with talc, bentonite or other inert powders or dusts in concentrations of say, from 0.1 percent to 2 percent and dusted on herbage, grasses, trees, etc., or they may be employed in aqueous suspensions, oil-in-water emulsions or organic solutions in like concentrations and sprayed on the organisms which are to be protected from the insect pests.

The invention is further illustrated, but not limited, by the following examples:

*Example 1*

Triethyl phosphite (66.4 g., 0.4 mole) was gradually added during 0.2 hour to a mixture consisting of 250 ml. of ether and 17.9 g. (0.2 mole) of cuprous cyanide. During introduction of the phosphite, the temperature of the reaction mixture rose from 21° C. to 34° C.; as soon as all of the ester had been introduced, it began to decrease. Stirring of the grayish-green reaction mixture at reflux for one hour resulted in the separation of a solid. After a total refluxing time of 5 hours, the reaction mixture was filtered to give 63.5 g. of a grayish-white solid, and evaporation of the filtrate under water-pump pressure gave an additional 20.0 g. of white solid. Crystallization of the combined solids from hexane gave fine white crystals of the 2:1 triethyl phosphite-cuprous cyanide complex, M.P. 121–123° C., and analyzing as follows:

| | Found | Calcd. for $C_{13}H_{30}CuNO_6P_2$ |
|---|---|---|
| Percent C | 37.36 | 37.0 |
| Percent H | 7.68 | 7.17 |
| Percent N | 3.51 | 3.32 |
| Percent P | 13.72 | 14.7 |

The 2:1 triethyl phosphite-cuprous cyanide complex of this example was evaluated as an insecticide by using the following test procedure:

A precision apparatus was employed for spraying known quantities of the test chemical in acetone solution onto insects. This consists of a horizontal tubular spray tower known as the Hoskins spray chamber and a precision atomizer known as the Potter nozzle. Acetone alone causes no mortality to sprayed insects when applied in this spray chamber.

Milkweed bugs, *Oncopeltus fasciatus*, were deposited on a filter paper in Petri dishes, and the dishes were placed in one end of the spray chamber. A 0.10 percent acetone solution of the 2:1 triethyl phosphite-cuprous cyanide complex, was sprayed into the other end of the chamber for 15 seconds. There was employed 20 ml. of the solution. Thirty seconds after spraying, the insects were removed from the chamber and placed on a clean filter paper and Petri dish. Observation of the insects after the expiration of 24 hours revealed a 100 percent kill. This test was strictly a contact spray test, since the insects were exposed to the 2:1 triethyl phosphite-cuprous cyanide complex for only the 15 second period.

In another experiment, the complex was tested against the flour beetle *Tribolium casteneum*. Petri dishes were sprayed with a one percent acetone solution of the 2:1 triethyl phosphite-cuprous cyanide complex, employing the spraying equipment described above, and the dishes were used for observing the effect of the spray residue alone against the beetles. The sprayed dishes were allowed to dry at room temperature for a period of 24 hours and the beetles were then placed into the dried dishes. Observation of the beetles after 24 hours revealed a 100 percent kill.

In still another test, bean plants infested with the 2-spotted spider mite were sprayed by means of an atomizer with a cyclohexanone-water emulsion containing a polyalkylene glycolalkylbenzenesulfonate emulsifier and 0.2 percent by weight, based on the total weight of said emulsion of the 2:1 triethyl phosphite-cuprous cyanide complex. The sprayed plants were held for one week for observation of kill of both mites and eggs. At the end of this time a 100 percent kill of both the adults and eggs were noted, but no injury to the sprayed plants themselves, was evidenced.

*Example 2*

To a mixture consisting of 26.9 g. (0.30 mole) of cuprous cyanide and 300 ml. of anhydrous ether there was gradually added, over a period of 0.35 hour, 49.8 g. (0.30 mole) of freshly distilled triethyl phosphite at a temperature of about 26° C. to 35.5° C., the reaction mixture warming to reflux during the addition. Refluxing was continued for another 2.5 hours. The whole was then allowed to stand overnight. About 0.4 g. of a solid probably cuprous cyanide was then removed from the reaction mixture by suction filtration. The filtrate thus obtained was submitted to distillation in vacuo to remove material boiling below 30° C./0.2 mm. There was thus obtained 76.8 g. of the viscous, light-colored 1:1 triethyl phosphite-cuprous cyanide complex, $n_D^{25}$ 1.4981, soluble in ether and acetone.

Testing of the 1:1 triethyl phosphite-cuprous cyanide complex against milkweed bug as described in Example 1, showed a 100 percent kill at 1.0 percent concentration.

When this complex was dissolved in ether, triethyl phosphite added to the solution and the ether removed from the resulting reaction mixture by evaporation there was obtained the white, crystalline 2:1 triethyl phosphite-cuprous cyanide complex, M.P. ca. 120° C.

*Example 3*

To a mixture consisting of 17.9 g. (0.2 mole) of cuprous cyanide and 250 ml. of ether there was added 100 g. (0.4 mole) of freshly distilled tributyl phosphite during a period of 0.2 hour. During the addition the temperature of the reaction mixture rose from 26° C. to 35° C., and it began to decrease as soon as all of the phosphite had been added. The whole was then refluxed for 3 hours, allowed to cool and then filtered with the aid of a filter aid. Concentration of the filtrate to a pot temperature of 63° C./0.2 mm. gave 118 g. (100% theoretical yield) of the substantially pure, viscous 2:1 tributyl phosphite-cuprous cyanide complex, $n_D^{25}$ 1.4722, and analyzing as follows:

|  | Found | Calcd. for $C_{25}H_{54}CuNO_6P_2$ |
| --- | --- | --- |
| Percent C | 50.6 | 50.8 |
| Percent H | 9.45 | 9.24 |
| Percent N | 2.45 | 2.37 |

Testing of the 2:1 tributyl phosphite-cuprous cyanide complex against milkweed bug as in Example 1 showed a 100 percent kill at the one percent concentration. Evaluation of the present complex against 2-spotted mite as described in Example 1, showed a 100 percent kill of adults at a 0.1 percent concentration.

*Example 4*

Anhydrous ether (200 ml.) and 22.4 g. (0.25 mole) of cuprous cyanide were placed in a 500 ml. flask and to this there was added, at a temperature of 20° C.–23.5° C., 77.5 g. (0.25 mole) of triphenyl phosphite during a time of 12 minutes. The whole was then refluxed for 3 hours. Upon standing at room temperature, the white, solid triphenyl phosphite-cuprous cyanide complex precipitated out.

What I claim is:

1. A complex addition product of the formula

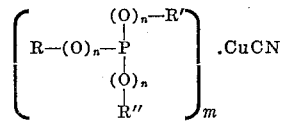

in which R, R' and R'' are hydrocarbon radicals free of non-benzenoid unsaturation and containing from 1 to 8 carbon atoms, $n$ is an integer of from 0 to 1, and $m$ is an integer of from 1 to 2.

2. A complex addition product of 1 mole of triethyl phosphite and 1 mole of cuprous cyanide.

3. A complex addition product of 2 moles of triethyl phosphite and 1 mole of cuprous cyanide.

4. A complex addition product of 2 moles of tributyl phosphite and 1 mole of cuprous cyanide.

5. The method which comprises contacting with cuprous cyanide a trivalent phosphorus compound having the formula

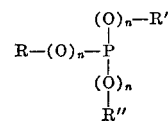

in which R, R' and R'' are hydrocarbon radicals free of non-benzenoid unsaturation and containing from 1 to 8 carbon atoms, and $n$ is an integer of from 0 to 1, and recovering from the resulting reaction product a complex addition product having the formula

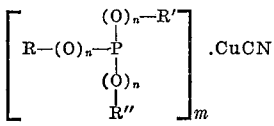

in which R, R', R'' and $n$ are as herein defined, and $m$ is an integer of from 1 to 2.

6. The method which comprises contacting triethyl phosphite with cuprous cyanide and recovering from the resulting reaction mixture a complex addition product of said phosphite with said cyanide.

7. The method which comprises contacting tributyl phosphite with cuprous cyanide and recovering from the resulting reaction mixture a complex addition product of said phosphite with said cyanide.

8. An insecticidal composition comprising an inert carrier and as the essential active ingredient a complex addition product having the formula

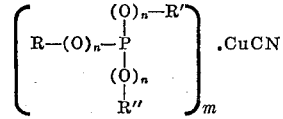

in which R, R' and R'' are hydrocarbon radicals free of non-benzenoid unsaturation and containing from 1 to 8 carbon atoms, $n$ is an integer of from 0 to 1, and $m$ is an integer of from 1 to 2.

9. An insecticidal composition comprising an inert carrier and as the essential active ingredient a complex addition product of 1 mole of triethyl phosphite with 1 mole of cuprous cyanide.

10. An insecticidal composition comprising an inert carrier and as the essential active ingredient a complex addition product of 2 moles of triethyl phosphite and 1 mole of cuprous cyanide.

11. An insecticidal composition comprising an inert carrier and as the essential active ingredient a complex addition product of 2 moles of tributyl phosphite and 1 mole of cuprous cyanide.

12. The method of destroying insect pests which comprises exposing said insects to a toxic quantity of an insecticidal composition comprising as the essential active ingredient a complex addition product of the formula

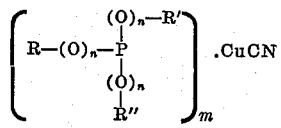

in which R, R' and R'' are hydrocarbon radicals free of non-benzenoid unsaturation and containing from 1 to 8 carbon atoms, $n$ is an integer of from 0 to 1, and $m$ is an integer of from 1 to 2.

References Cited in the file of this patent

UNITED STATES PATENTS 1,880,516     Stauf et al. _____ Oct. 4, 1932

OTHER REFERENCES

Arbusoff: "Ber.," vol. 38, pp. 1171–3 (1905).
Chem. Soc. Journal (London), July-Dec. 1940, pp. 1216–1221 (article by Evans et al.).
Chem. Abstracts, 37:P3542² (1943) and 36:5905⁶ (1942).
Frear: Catalogue, vol. I, Chemical Insecticides (1947), p. 173.
Frear: Catalogue, vol. I, Chemical Insecticides (1947), p. 168.
Organophosphorus Compounds, Kosolapoff, John Wiley & Sons, N.Y. (1950), p. 23.
J. Am. Chem. Society, vol. 75, Aug. 20, 1953, pp. 3967–3969.